United States Patent

Davis

[15] 3,653,362

[45] Apr. 4, 1972

[54] DISPOSABLE PET ANIMAL FEED CONTAINER AND HOLDER

[72] Inventor: Paul Davis, Swampscott, Mass.

[73] Assignee: Sweetheart Plastics, Inc., Wilmington, Mass.

[22] Filed: Aug. 19, 1970

[21] Appl. No.: 65,166

[52] U.S. Cl. .................................. 119/61, 119/1, 220/17
[51] Int. Cl. ................................................. A01k 5/00
[58] Field of Search ............... 119/61, 1, 74; 220/17, 63; 215/100; 43/131

[56] References Cited

UNITED STATES PATENTS

| | | | |
|---|---|---|---|
| 2,213,837 | 9/1940 | Gill | 220/17 |
| 2,638,872 | 5/1953 | Potter | 119/61 |
| 2,736,128 | 2/1956 | Conyers | 43/131 |
| 2,905,351 | 9/1959 | Lerner | 215/100 |
| 3,076,435 | 2/1963 | Seymour | 119/61 X |
| 3,455,280 | 7/1969 | Keene | 119/61 |
| 3,527,192 | 9/1970 | Ferrara | 119/61 |

Primary Examiner—Aldrich F. Medbery
Attorney—Wolf, Greenfield and Sacks

[57] ABSTRACT

A pet feeder having a reusable holder and disposable liner with both the liner and holder being separately nestable with other like liners and holders when empty.

10 Claims, 4 Drawing Figures

INVENTOR
PAUL DAVIS

BY Wolf, Greenfield & Sacks

ATTORNEYS

INVENTOR
PAUL DAVIS

DISPOSABLE PET ANIMAL FEED CONTAINER AND HOLDER

This invention relates to disposable plastic containers used with reusable holders and more particularly comprises a new and improved pet feeder and concept for packaging pet foods.

At the present time pet foods are packaged in bulk and are served either in rigid reusable relatively expensive containers or in disposable containers which are messy, unsteady and often most unattractive. The reusable relatively expensive containers of course must be washed after each use if they are to be sanitary, and they do not lend themselves to single service packaging because of their cost. The disposable containers ordinarily have exposed edges which are mutilated by the animal and in some cases the container edges are nibbled by the pet to the detriment of the pet's health. The disposable dishes are also quite unsteady and are easily upset by the pet during feeding.

One important object of this invention is to provide a pet feeder which encompasses the advantages of both the reusable and disposable pet feeders found in the prior art and makes possible a new concept in the packaging and sale of pet foods.

A more specific object of this invention is to provide a pet feeder having a disposable liner in the form of a self supporting, plastic container and a rigid, reusable holder which stabilizes the container and protects its edges so that they may not be torn or bitten.

Another specific object of this invention is to provide a reusable holder for pet food containers, which has a stabilizing side wall and an upwardly extending rim that encloses the rim of the plastic liner.

Another object of this invention is to provide a pet feeder having a reusable holder and disposable plastic liner with means cooperating between the two so as to prevent the animal from withdrawing the liner from the holder.

Yet another object of this invention is to provide reusable holders and disposable plastic liners, each of which is nestable, so that they may be compactly stacked when empty.

Yet another object of this invention is to provide a disposable plastic food liner having a rim especially shaped for ready heat sealing to a film cover.

To accomplish these and other objects the pet feeder of this invention includes a disposable one-piece thin wall plastic liner or container having stacking means so that identical empty containers may be stacked in closely nested relationship. The feeder also includes a reusable relatively heavy holder having means which support the container when the two are assembled, and having a rim portion at the top for guarding against accidental withdrawal of the container from the holder and for preventing the pet from biting the container rim.

Figure 1:
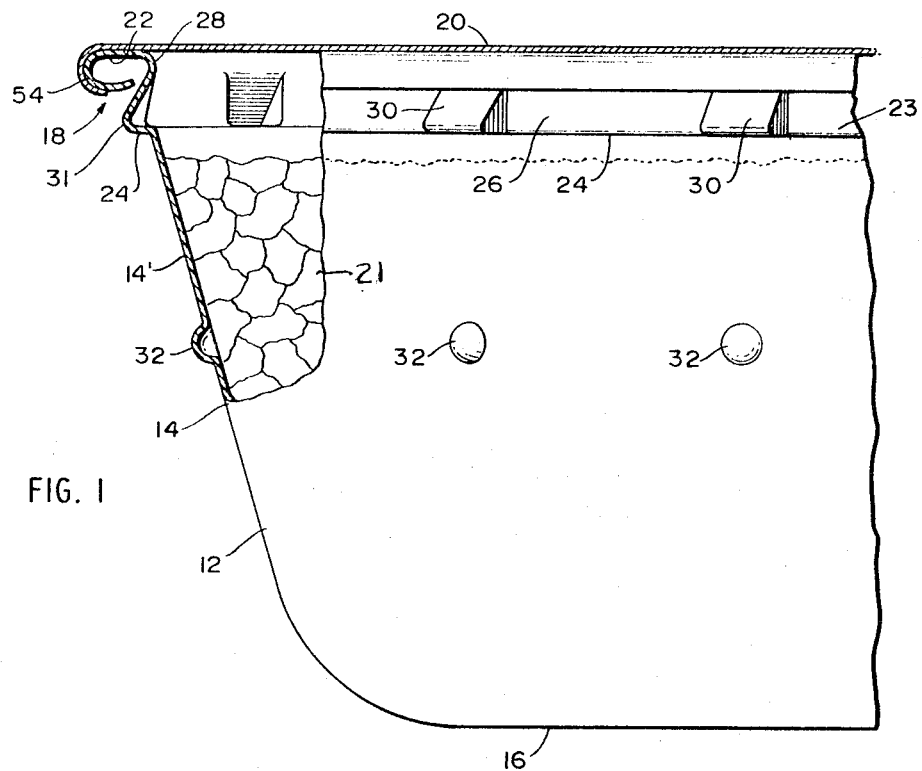
FIG. 1 is a fragmentary side view, partly in section, of a container liner constructed in accordance with this invention and suggesting the manner in which it is filled and covered.

In the drawing the pet feeder of this invention is shown composed of a holder 10 and a liner 12. The holder 10 preferably is molded of a plastic material and is designed for extended use. Therefore it should be capable of sustaining temperatures used in machine washing without becoming soft, and it should be of sufficient rigidity and ruggedness to withstand the abuse to which such items are normally subjected. The liner 12 in accordance with this invention is a disposable container and is made of one-piece, thin wall thermoplastic material.

The liner 12 is shown in detail in FIG. 1 and includes a side wall 14, bottom wall 16, and rim 18. In FIG. 1 the container is shown closed by thin film sheet 20 which is heat sealed to the crown 22 of the rim 18. The drawing also suggests that the container is filled with pet food 21. Obviously this food may take any form and be either solid, semi-solid, or liquid.

The side wall 14 of the container 12 is provided with a nesting ring 23 which may take any one of several forms. In the embodiment shown, the nesting ring is a generally Z-shaped configuration that includes a lower shoulder 24 and an intermediate upwardly and inwardly inclined wall section 26 and an upper shoulder 28 which is contiguous with and comprises an extension of the crown 22 of the rim 18. The stacking ring 23 is also provided with a number of spaced outwardly extending protuberances 30 which enlarge the effective width of the lower shoulder 24 of the nesting ring as the protuberances extend beyond the outer edge 31 of the lower shoulder. This arrangement is shown clearly in FIG. 1. The protuberances 30 may function particularly when the liner is inserted in the holder 10.

The side wall of the container 12 also includes a number of outwardly extending circumferentially spaced dimples 32. The dimples 32 are designed to releasably hold the liner 12 in holder 10 when the two are assembled in the manner shown in FIG. 2. The dimples 32 are not so large as to interfere with the proper nesting of identical liners 12 in the manner shown in FIG. 3.

When identical liners 12 are nested together, the lower shoulder 24 of the nesting ring 23 rests on the shoulder 28 which is a continuation of the crown 22 of the rim. The axial extent of the nesting ring 23 and the slope of the side wall 14 are such that when the shoulder 24 rests on the upper shoulder 28 of the next lower liner in a stack, the side walls 14 do not rub against one another so as to cause the two liners to stick together. The protuberances 30 which increase the radial extent of the lower shoulder 24 increase the radial extent of the interference between the upper and lower shoulders of adjacent containers so as to insure against jamming.

Figure 2:
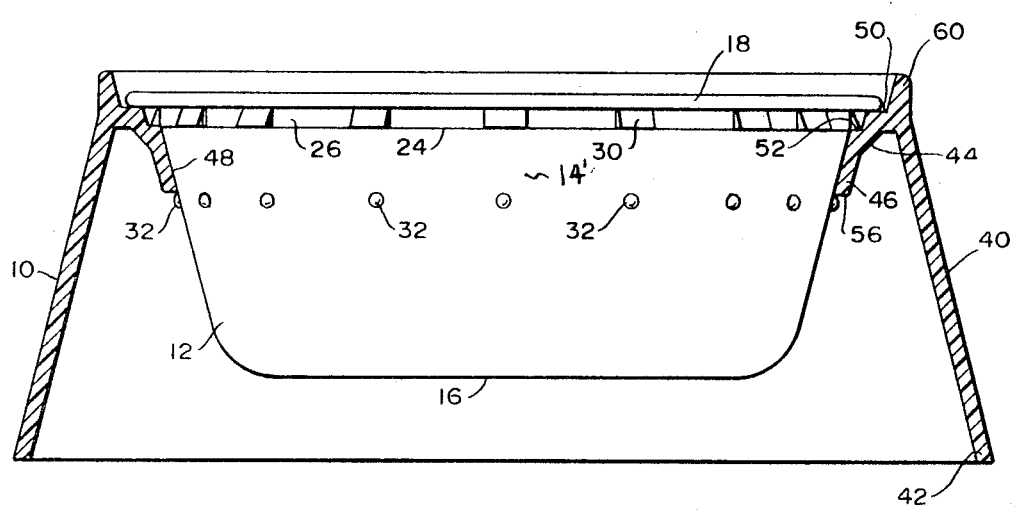
FIG. 2 is a cross sectional view of a holder shown supporting the container of FIG. 1 in position for use.
Figure 3:
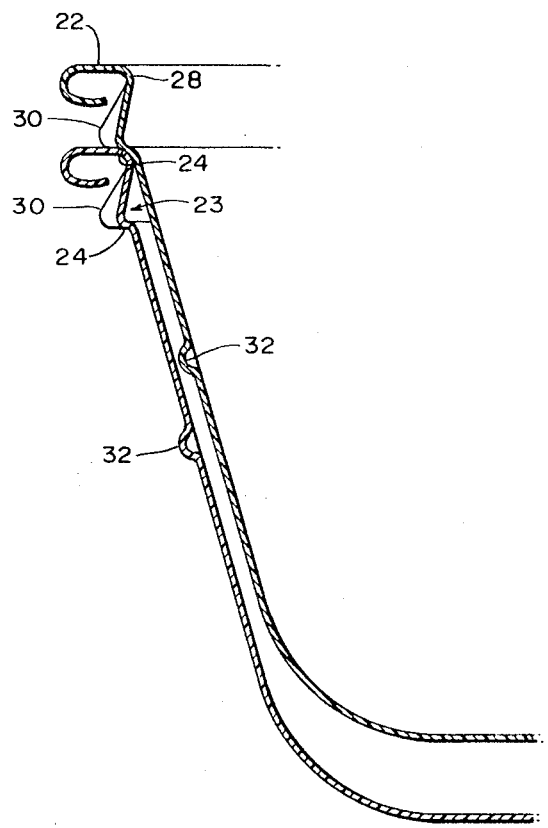
FIG. 3 is a fragmentary cross-sectional view of two nested liners.

The holder 10 shown in FIG. 2 includes a side wall 40 which extends upwardly and inwardly from its lower edge to provide a relatively large diameter base 42. An inwardly extending shoulder 44 is formed on the inside of side wall 40, and a skirt 46 extends downwardly on the inner edge of shoulder 44. The skirt 46 has the same taper as the upper portion 14' of the side wall 14 of the liner so that when the liner is in place in the holder wall 14 lies in face to face relationship with the inner surface 48 of skirt 46.

In the embodiment shown, the shoulder 44 has two horizontal steps 50 and 52. The horizontal steps 50 and 52 are positioned to support rim 18 and lower shoulder 24 of nesting ring 23, respectively of the liner 12. In FIG. 1 it will be noted that the rim 18 is curled under at 54 to a substantially horizontal plane below the crown 22, and the bottom 54 of the curl in FIG. 2 is shown to rest upon the upper shoulder 50. The lower shoulder 24 of the liner 12 and the extensions of the lower shoulder formed by the protuberances 30 rest upon the lower shoulder 52 of the holder. While in this embodiment both the rim and the lower shoulder 24 of the nesting ring are shown in contact with the shoulders of the holder, it is be understood that either one of the shoulders 50 and 52 may support the liner without the assistance of the other. That is, it is unnecessary, to achieve stability, to have both the rim and the lower shoulder of the nesting ring in contact simultaneously with their respective shoulders in the holder.

In FIG. 2, the dimples 32 are shown disposed immediately beneath lower end 56 of skirt 46. When the holder and liner are assembled, dimples 32 extend radially beyond the inner edge of the lower end 56 of the skirt and bear against the end to prevent accidental withdrawal of the liner. Because the liner 12 is made of a yieldable plastic material and has a relatively thin wall thickness, the dimples 32 are deformable and are able to compress when the liner is slipped into place. The dimples 32 engage the inner surface 48 of skirt 46 and depress inwardly until they are allowed to expand freely below lower end 56 of the skirt. Similarly, the liner may be withdrawn from the holder readily by pushing it up from the bottom. Dimples 32 under such a force will distort so as to escape from the lower end 56 of the skirt and permit the container to be withdrawn.

The holder 10 also includes an upwardly extending rim portion 60 which extends upwardly beyond the rim 18 of the liner when the two are assembled. The rim 60 of holder 10 forms a guard so that the liner rim 18 is substantially inaccessible from the top of the holder. That is, the rim of the holder makes it extremely difficult to grasp rim 18 of the liner when the liner is in place. Therefore, a dog or cat will not readily be able to grasp the rim 18 either with its paw or mouth to pull the liner up and out of the holder. Nevertheless, the holder rim 60 in no way interferes with the ejection of the liner from the holder by means of an upwardly directed force against the liner bottom wall 16.

In FIG. 2 it is apparent that the downwardly and outwardly flared configuration of the side wall 40 of the holder adds substantial stability to the feeder. Even if a dog places its paw on the holder rim 60 the holder will not readily tip. This is an important advantage for an acceptable feeding dish. Such stability is required to avoid constant tipping of the container.

Figure 4:
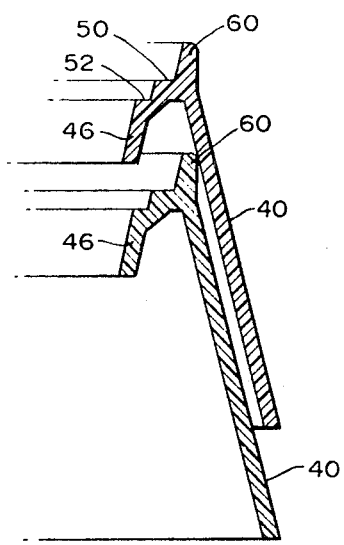
FIG. 4 is a fragmentary cross-sectional view of two nested holders.

The concept of the disposable liner and reusable holder allows individual servings of pet food to be packaged in their own dish so that the pet owner need not handle the food in any way. Merely by removing the cover such as is suggested at 20 in FIG. 1 and slipping the filled liner in the holder, the food is ready to be eaten. When the pet is through eating, the liner may be discarded with any food which remains, and the holder 10 will be free of all leftover food. The holder, which is rigid and reusable may be attractively decorated and under normal use will not become marred by the animal's paws or teeth, because the liner will protect it. In the form shown, not only is the liner nestable when empty, but the holder is nestable as well. As suggested in FIG. 4, a number of empty liners may be stacked compactly one on top of the other on a shelf for efficient storage during manufacture and sale. When nested, the rim 60 of the lower holder engages the side wall 40 of the next upper holder just beneath shoulder 44, and the holders may be readily separated.

What is claimed is:

1. A pet animal feeder comprising
    a disposable one-piece thin wall thermoplastic container having bottom and side walls, said side walls having adjacent their top portion an outwardly extending support means,
    stacking means provided in the container enabling identical empty containers to be stacked in closely nested relationship,
    and a reusable relatively heavy holder having inwardly projecting support means engaging support means of the container, said holder having an upstanding rim portion of a heighth extending above the side wall of the container for guarding against withdrawal of the container from the holder by the pet.

2. A pet feeder as described in claim 1 further characterized by
    said container having a nesting ring forming said stacking means in its side wall at the top and also having an outwardly extending rim,
    and shoulder means in the holder forming said support means, said shoulder means bearing at least one of the nesting ring and rim.

3. A pet feeder as described in claim 1 further characterized by
    a skirt in the holder extending downwardly from the holder rim for engaging the side wall of the container,
    and means on the container side wall cooperating with the skirt for retaining the container in the holder.

4. A pet feeder as described in claim 2 further characterized by
    said shoulder means supporting said nesting ring,
    a skirt in the holder extending downwardly from the holder rim for engaging the side wall of the container,
    and means on the container side wall cooperating with the skirt for retaining the container in the holder.

5. A pet feeder as described in claim 2 further characterized by
    said shoulder means supporting said container rim,
    a skirt in the holder extending downwardly from the holder rim for engaging the side wall of the container,
    and means on the container side wall cooperating with the skirt for retaining the container in the holder.

6. A pet feeder as described in claim 2 further characterized by
    said holder rim extending above and surrounding the container rim,
    and a downwardly and outwardly flared side wall forming part of the holder for stabilizing the feeder to prevent the assembled holder and container from tipping.

7. A pet feeder as described in claim 6 further characterized by
    a skirt in the holder within the side wall and extending inwardly and downwardly from the holder rim for engaging the container side wall.

8. A pet feeder as described in claim 7 further characterized by
    an outwardly extending projection formed on the container side wall and lying below the skirt when the container is mounted in the holder and preventing accidental withdrawal of the container from the holder by bearing against the bottom of the skirt.

9. A pet feeder as described in claim 1 further characterized by
    said container having a relatively flat rim suitable for being sealed to a film cover.

10. A pet feeder as described in claim 1 further characterized by
    said holder being nestable in close association with other identical holders.

* * * * *